(12) United States Patent
Ogawa et al.

(10) Patent No.: US 6,644,814 B2
(45) Date of Patent: Nov. 11, 2003

(54) LED-ILLUMINATION-TYPE DMD PROJECTOR AND OPTICAL SYSTEM THEREOF

(75) Inventors: Jun Ogawa, Tokyo (JP); Atsushi Katou, Tokyo (JP)

(73) Assignee: NEC Viewtechnology Ltd., Tokyo (JP)

( * ) Notice: Subject to any disclaimer, the term of this patent is extended or adjusted under 35 U.S.C. 154(b) by 0 days.

(21) Appl. No.: 10/322,482

(22) Filed: Dec. 19, 2002

(65) Prior Publication Data

US 2003/0133080 A1 Jul. 17, 2003

(30) Foreign Application Priority Data

Dec. 21, 2001 (JP) ........................................ 2001-389899

(51) Int. Cl.[7] .............................................. G03B 21/14
(52) U.S. Cl. ........................................... 353/31; 33/122
(58) Field of Search .............................. 353/30, 31, 33, 353/122, 52; 362/555, 268

(56) References Cited

U.S. PATENT DOCUMENTS 6,220,714 B1 * 4/2001 Eguchi ....................... 353/122

FOREIGN PATENT DOCUMENTS

JP         2001-249400 A      9/2001

* cited by examiner

Primary Examiner—Russell Adams
Assistant Examiner—Michael Dacakis
(74) Attorney, Agent, or Firm—Sughrue Mion, PLLC (57) ABSTRACT

A DMD projector of small size, lightweight and long life, which employs LED arrays as a light source for brighter screen. According to the projector, projection light from sets of a LED array, a first fly-eye lens appressed thereto, and a second fly-eye lens disposed at a distance therefrom, which are prepared for red, green and blue, enters into three entrance planes of a XDP, and a synthesized light of red, green and blue is projected from the exit plane of the XDP to illuminate a DMD panel. At this point, rays reflected from on-pixels of the DMD panel makes images on a screen via a projection lens using an optical system in which extended images of the same number as the elements of the LED arrays, the images being obtained through exit pupils of respective element lenses of the first fly-eye lenses, the corresponding element lenses of the second fly-eye lenses, and the subsequent illumination lenses, are focused and superposed on the DMD panel. In addition, the projector projects images in color by synchronizing on/off signals of red, green and blue with on/off signals of the pixels on the DMD panel.

13 Claims, 4 Drawing Sheets

ELEMENT LENS OF 2G (TURNED)

LED-ILLUMINATION-TYPE DMD PROJECTOR AND OPTICAL SYSTEM THEREOF

BACKGROUND OF THE INVENTION

The present invention relates to a DMD (Digital Micromirror Device) projector, and in particular, to an optical system of the DMD projector.

DESCRIPTION OF THE RELATED ART

Heretofore, an extra-high pressure mercury lamp, a xenon lamp or the like having a light source by heat has been employed for a source of illumination in a conventional DMD projector.

Meanwhile, in the field of transmissive liquid crystal projectors, a liquid crystal projector has been proposed in Japanese Patent Application Laid-Open No. 2001-249400. In the liquid crystal projector, a liquid crystal panel has to be illuminated with linear polarization. When it is illuminated with natural light, only a part of rays of the natural light is used as illumination owing to a polarization plate placed just before the liquid crystal panel. Accordingly, the liquid crystal panel becomes dark. In addition, the rays that are not used as illumination lead to an increase in temperature of the liquid crystal panel.

Since the conventional DMD projector is provided with the source of illumination by heat as described above, its conversion efficiency from input power to light is low. Consequently, the DMD projector requires a larger input power, a large-sized power source and lamp (mostly provided with a reflecting mirror), a cooling fan and the like. Accordingly, the DMD projector increases in weight and the life of a DMD panel is shortened owing to the heat.

In another conventional 1-chip-type DMD projector, an illumination optics system for color display is provided with a rotary color filter, also named as a color wheel, and images in respective colors are sequentially displayed (time-division-color-displayed) by synchronizing the rotation of the color wheel with on/off signals of respective pixels of a DMD panel so that normal color images can be produced to the human eye due to the effect of afterimages. However, the DMD projector has the problem that the sound generated when driving a rotating motor for the color wheel becomes a source of noise at a constant level.

Besides, even when LEDs (Light Emitting Diodes) having high light conversion efficiency are employed to reduce the input power, a screen onto which a picture is projected may become dark. In that event, the object of the projector cannot be accomplished.

Moreover, the conventional projector is indispensably provided with an AC100V power source for a light source by heat and for driving the cooling fan, the motor and the like. However, it has been a task to achieve the projector driven by a battery to offer a mobile projector.

SUMMARY OF THE INVENTION

It is therefore an object of the present invention to provide a DMD projector and an optical system thereof employing LEDs for a bright projection screen, wherein input power for illumination is drastically reduced, and a power source and a light source are significantly reduced in size and weight as well as extending the life of a DMD panel to the same level as that of micro solid-state devices.

According to a first aspect of the present invention, for achieving the objects mentioned above, there is provided a digital-micromirror-device projector for displaying color images by synchronizing respective on/off signals of red, green and blue with on/off signals of the pixels of the digital-micromirror-device panel, comprising:

light emitting diode arrays for red, green and blue;

first fly-eye lenses disposed in contact with the light emitting diode arrays;

second fly-eye lenses disposed at a distance from the first fly-eye lenses;

a cross dichroic prism into which lights of red, green and blue projected from the second fly-eye lenses enters through respective entrance planes for red, green and blue, and which projects synthesized light of red, green and blue through a remaining exit plane;

an illumination optical system for focusing and superposing extended images, which are of the same number as elements of the light emitting diode arrays, from exit pupils of respective element lenses of the first fly-eye lenses via the corresponding element lenses of the second fly-eye lenses and the subsequent illumination lenses on a digital-micromirror-device panel on the occasion of illuminating the digital-micromirror-device panel with the synthesized light projected from the cross dichroic prism; and a projection optical system for focusing rays reflected from on-pixels of the digital-micromirror-device panel on a screen in response to on/off switch of pixels of the digital-micromirror-device panel.

According to a second aspect of the present invention, in the first aspect, dicroic mirrors of the cross dichroic prism are replaced by dichroic plane mirrors.

According to a third aspect of the present invention, in the first or second aspect, one side of the respective elements of the first fly-eye lenses disposed in contact with the light emitting diode arrays is aspherical to illuminate the plane of the digital-micromirror-device panel with high illuminance and high uniformity.

According to a fourth aspect of the present invention, in the first or second aspect, one side of the respective elements of the first fly-eye lenses disposed in contact with the light emitting diode arrays is spherical, whose curvature radius R mm, thickness of lens d mm, and refractive index n at a line e of wavelength satisfy the following three conditional expressions.

$$|R| \leq 5.0 \quad (1)$$
$$d \geq 5.0 \quad (2)$$
$$n \geq 1.8 \quad (3)$$

According to a fifth aspect of the present invention, there is provided a digital-micromirror-device projector for displaying color images by synchronizing respective on/off signals of red, green and blue with on/off signals of the pixels of the digital-micromirror-device panel comprising:

light emitting diode arrays for red, green and blue;

first fly-eye lenses disposed in contact with the light emitting diode arrays, as well as in contact with or close to entrance planes for red, green and blue of a cross dichroic prism;

the cross dichroic prism into which lights of red, green and blue projected from the first fly-eye lenses enters through the respective entrance planes for red, green and blue, and which projects synthesized light of red, green and blue through a remaining exit plane;

a second fly-eye lens disposed in contact with or close to the exit plane of the cross dichroic prism for receiving the synthesized light of red, green and blue from the exit plane;

an illumination optical system for focusing and superposing extended images, which are of the same number as elements of the light emitting diode arrays, from exit pupils of respective element lenses of the first fly-eye lenses via the cross dichroic prism, the corresponding element lenses of the second fly-eye lens and the subsequent illumination lenses on a digital-micromirror-device panel on the occasion of illuminating the digital-micromirror-device panel with the synthesized light projected from the cross dichroic prism; and a projection optical system for focusing rays reflected from on-pixels of the digital-micromirror-device panel on a screen in response to on/off switch of pixels of the digital-micromirror-device panel.

According to a sixth aspect of the present invention, in the fifth aspect, dicroic mirrors of the cross dichroic prism are replaced by dichroic plane mirrors.

According to a seventh aspect of the present invention, in the fifth or sixth aspect, one side of the respective elements of the first fly-eye lenses disposed in contact with the light emitting diode arrays is aspherical to illuminate the plane of the digital-micromirror-device panel with high illuminance and high uniformity.

According to an eighth aspect of the present invention, in the fifth or sixth aspect, one side of the respective elements of the first fly-eye lenses disposed in contact with the light emitting diode arrays is spherical, whose curvature radius R mm, thickness of lens d mm, and refractive index n at a line e of wavelength satisfy the following three conditional expressions.

$$|R| \leq 5.0 \quad (1)$$

$$d \geq 5.0 \quad (2)$$

$$n \geq 1.8 \quad (3)$$

According to a ninth aspect of the present invention, there is provided an optical system used in the digital-micromirror-device projector as mentioned in any one of first to eighth aspects.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the drawings, embodiments of the present invention are explained in detail.

First, an explanation is given of a fundamental policy of the present invention.

According to the present invention, LED arrays are employed as a source of illumination in place of the conventional source of illumination described hereinbefore. Accordingly, power requirements are drastically reduced. The LED arrays, where a plurality of LEDs are arranged in rows, are used in combination with the integrator configuration of an illumination system to keep brighter illuminance on a screen. The explanation of the integrator configuration is given later. Moreover, a cross dichroic prism (hereinafter referred to as "XDP"), which has been in heavy usage disposed between a projection lens and a liquid crystal panel in a liquid crystal projector, is employed in the optical system of the present invention. The XDP synthesizes lights of red (R), green (G), and blue (B). To be concrete, first, monochromatic rays of R, G and B are generated through respective sets of a LED array, a first fly-eye lens appressed against the LED array, and a second fly-eye lens disposed at a distance from the first fly-eye lens, which are prepared for R, G and B. The generated monochromatic rays of R, G and B enter the XDP through respective entrance planes for R, G and B to be synthesized. Finally, the synthesized rays of R, G and B are projected through an exit plane of the XDP. While a XDP has been used in a projection optical system heretofore, the XDP of the present invention is used in the illumination optical system. Thereby, extreme high accuracy is not required for the XDP. Consequently, a combination of (cross) dichroic plane mirrors may be used as a substitute for the XDP.

The rays thus synthesized irradiate a DMD panel via the following appropriate optical system. To be more precise, extended images from exit pupils of the respective first fly-eye lens elements are focused on the DMD panel plane via the second fly-eye lens elements corresponding to the first fly-eye lens elements, respectively, and the following optical system. Practically, the images are extended and projected on the DMD panel in such a manner as to allow appropriate margins therein. That is, the extended images corresponding to the number of the first fly-eye lens elements are superposed on the DMD panel. Such configuration as described above is referred to as an integrator configuration of the illumination system (or one embodiment thereof).

In the subsequent projection optical system, that is, the optical system for projecting the images in the DMD panel thus illuminated on a screen, the rays reflected from the on-pixels are focused on a screen in response to on/off switch of pixels of the DMD panel. By this means, the images are displayed in color by synchronizing respective on/off signals of R, G and B with on/off signals of the pixels of the DMD panel in the DMD projector of the present invention.

Hereat, a detailed explanation is given of the illumination optical system. The first fly-eye lenses are of especial importance in the illumination optical system. The respective element lenses of the first fly-eye lens collect light emitted from the respective LED elements as effectively as possible with minimum escaping light. At this point, it should be noted that the exit pupils of the respective element lenses of the first fly-eye lens are illuminated as uniformly as possible and project the collected light to the corresponding element lenses of the second fly-eye lens, respectively, without leaking the light in the vicinity so that the collected light is focused within the pupils of the corresponding element lenses of the second fly-eye lens. These are the roles to be played by the first fly-eye lens.

For this purpose, one side of the first fly-eye lens is aspherized (the third aspect of the present invention) in a first embodiment. By the aspherization, paraxial rays through the lens are concentrated at a near focus area, the spherical aberration of rays passing through the intermediate to marginal portion of the lens does not become too under where the rays therethrough intersect with each other before reaching the near focus area, and the exit pupils are almost uniformly illuminated. However, the conditions of the uniform illumination depend on characteristics of luminous intensity distribution of the LEDs, and the like. Therefore, it is also important to develop LEDs having preferable characteristics of luminous intensity distribution.

On the other hand, one side of the first fly-eye lens is spherically formed (the forth aspect of the present invention) in a second embodiment. In this case, it is preferable to reduce the curvature radius $|R|$ to short the focal length for obtaining increased efficiency of light condensing (the conditional expression 1; $|R| \leq 5.0$). Namely, the curvature radius $|R|$ of the plane is set within the range of the conditional expression 1 so that the spherical aberration does not become too large. To prevent the spherical aberration from being excessively produced and the rays from failing in entering into the corresponding lens elements of the second fly-eye lens when reducing the curvature radius $|R|$ of the first fly-eye lens plane too much, there is a need to maintain a large refractive index n of the lens (vitreous material such as glass) (the conditional expression 3: $n \geq 1.8$). Namely, the refractive index n is set to meet the conditional expression 3 so that the focal distance can be sufficiently shortened. At this point, the exit pupils of the respective element lenses of the first fly-eye lens have to be illuminated as uniformly as possible. For this purpose, a conditional expression 2; $d \geq 5.0$ is required to set an appropriate thickness of the lens. By the conditional expression 2, the thickness of the lens becomes appropriate to uniformly illuminate the exit pupils of the first fly-eye lens and to shorten the focal length so that the light condensing can be efficiently performed.

Hereat, a summary is made of the conditional expressions 1 to 3 according to the forth aspect of the present invention. First, in reference to the conditional expression 1, the curvature radius $|R|$ of the plane of the first fly-eye lens has to be a steady value of 5.0 mm or less. Thereby, the focal length of the element lenses of the first fly-eye lens can be shortened and thus the efficiency of light condensing can be improved. Second, in reference to the conditional expression 2, the thickness d of the first fly-eye lens has to be a steady value of 5.0 mm or more. Thereby, it becomes possible to uniform the illuminance on the exit pupils. Third, in reference to the conditional expression 3, the refractive index of the vitreous material has to be maintained at a steady value of 1.8 or more to further improve the efficiency of light condensing and to restrain the generation of further spherical aberration, while the efficiency thereof is improved to some extent according to the conditional expression 1. Thereby, the efficiency of light condensing can be sufficiently improved.

The respective conditional expressions 1 to 3 as described above should have been strictly expressed and explained by a ratio normalized with the focal length, aperture size of an element lens or the like, not by the absolute sizes as aforementioned. In the present invention, however, they are expressed by the absolute sizes since, as a matter of fact, the values fall within a range of practical absolute values. Obviously, the conditional expressions expressed by such a ratio as described hereinbefore may be employed in the present invention.

According to the present invention, by employing the LED arrays as a light source, it becomes possible to realize a 1-chip-type DMD projector whose size, weight and power consumption are drastically reduced in comparison with the conventional one. In particular, a projector with bright and uniform illumination is realized by employing the integrator configuration in which the first fly-eye lens and the second fly-eye lens are used in combination to superpose images from the exit pupils of the first fly-eye lens, the images being of the same number as that of the elements of the LED arrays, on the DMD panel using the LEDs as a light source. The element lenses of the first fly-eye lens, which is one of the most important parts of the present invention, can be realized by employing an aspherical lens or a spherical lens that satisfies the three conditional expressions.

The nonuse of a light source by heat results in notable reduction of heat quantity entering into the DMD panel, and consequently, the life of the DMD panel is drastically prolonged. Moreover, since a color wheel is unnecessary, the problems involved in the life of a motor, noise and the like do not have to be considered. In addition, since the light source by heat is not employed and various motors for a cooling fan, a color wheel and the like becomes unnecessary, power consumption is drastically reduced. By this means, a whole projector can be driven by a battery.

The present invention becomes effective when implemented as a DMD projector using the DMD panel. Since the DMD panel does not have selectivity for polarized light and all of the natural light is effectively used, it becomes possible to eliminate the concern about polarized light as raised in the liquid crystal panel.

Consequently, the DMD panel is practically essential to the optical system of the present invention. By the combination of the DMD panel and the optical system of the present invention, an effective projector can be realized.

Incidentally, in the present invention, the illumination optical system can be configured such that the three first fly-eye lenses contacted with the LED arrays each of which serves as a light source are appressed to or set close to the entrance planes for R, G and B of the XDP, and the second fly-eye lens is contacted with or set close to the exit plane thereof for common use by R, G and B (the fifth and sixth aspects of the present invention).

In the following, an explanation is given in detail of embodiments of the present invention referring to the drawings. Incidentally, in FIGS. 1, 2, 3, 4, 5 and 6, the light paths are simplified for easy understanding.

[First Embodiment]

Figure 1:
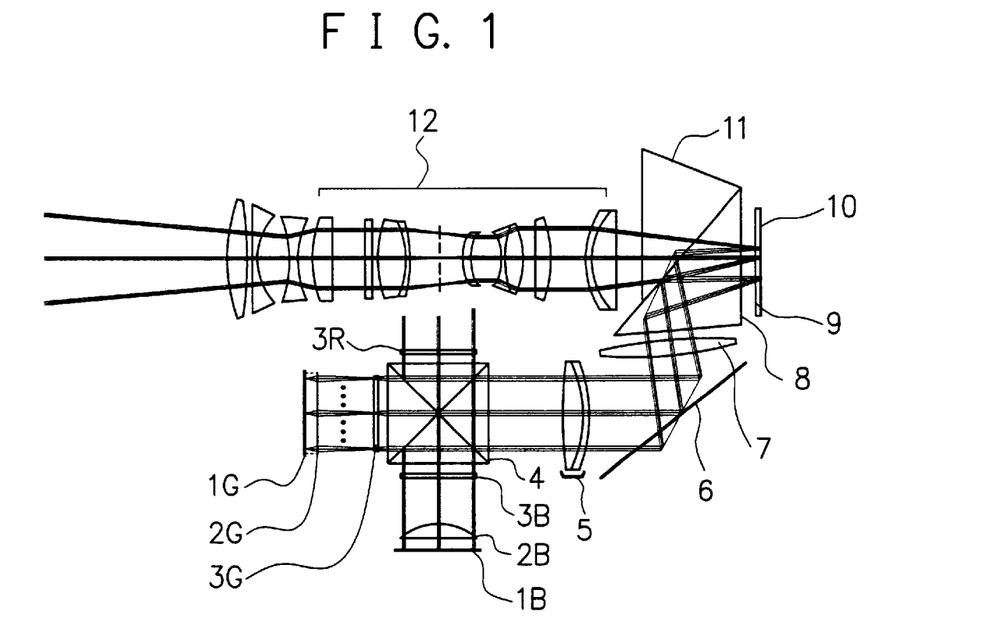
FIG. 1 is a projection diagram wherein a cross section of an optical system at its 45-degree-inclined plane against a horizontal plane is projected on the horizontal plane according to a first embodiment of the present invention (a part of light paths of R is abbreviated because it runs under a projection lens)
Figure 2:
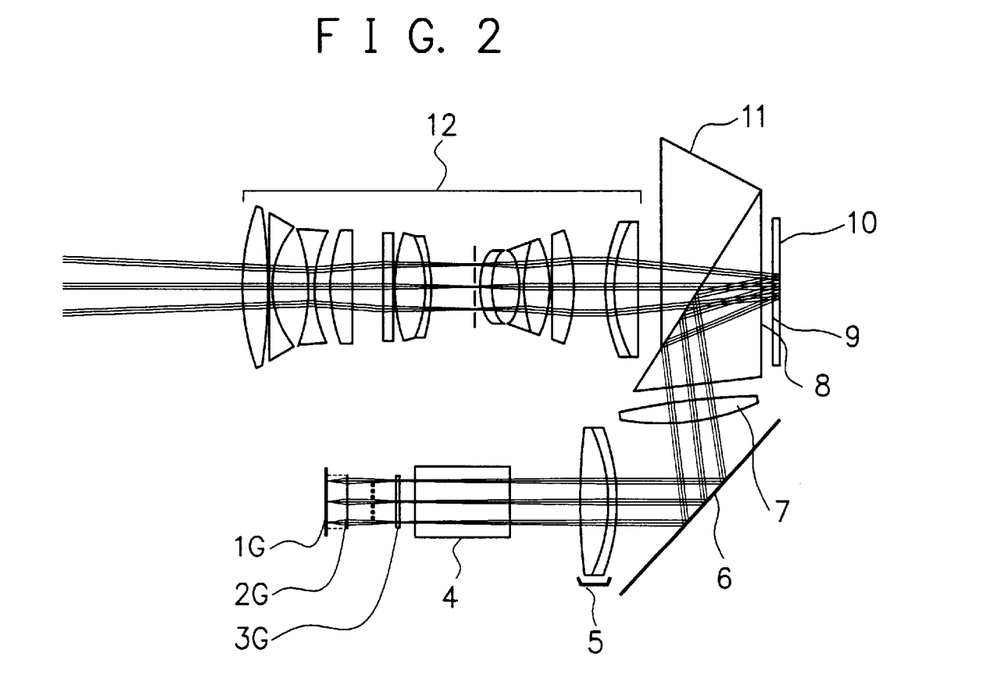
FIG. 2 is a cross sectional view of the optical system at the 45-degree-inclined plane according to the first embodiment (only the light paths of G are depicted and the light paths of R and B are abbreviated)
Figure 3:
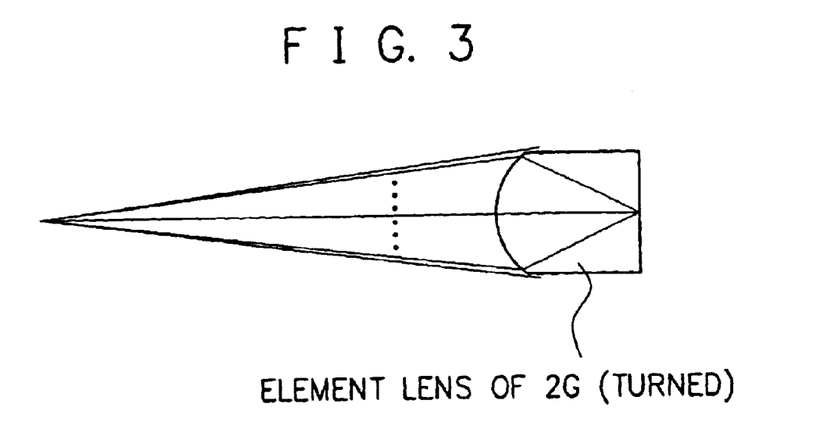
FIG. 3 is a diagram showing an (turned) element lens of a first fly-eye lens depicted in FIG. 1.

FIGS. 1 and 2 are diagrams each showing light paths in the optical system according to the first embodiment. FIG. 3 is an enlarged illustration of an (turned) element lens of the first fly-eye lens depicted in FIG. 1.

The DMD projector according to the first embodiment comprises LED arrays 1R (behind and not shown in FIG. 1), 1G and 1B, first fly-eye lenses 2R (behind and not shown therein), 2G and 2B, second fly-eye lenses 3R, 3G and 3B, a XDP 4, an illumination lens 5, a reflecting mirror 6, an illumination lens 7, a DMD illumination prism 8, a DMD panel window 9, a DMD panel 10, a DMD illumination prism 11, and a projection lens 12.

FIG. 1 is a projection diagram wherein a cross section of the optical system in a plane inclined at 45 degrees to the horizontal plane is projected on the horizontal plane. That is, the LED arrays are in a position lower than the projection lens 12. Among the light paths of R, G and B, the light paths of R runs under a projection lens 12 and thereby a part of them is abbreviated in FIG. 1. In FIG. 1, LED arrays 1R (behind and not shown in FIG. 1), 1G and 1B, first fly-eye lenses 2R (behind and not shown therein), 2G and 2B, second fly-eye lenses 3R, 3G and 3B, a XDP 4 and a DMD panel 10 that is available in the horizontal direction are depicted with no distortion.

On the other hand, there is distortion of the other lenses and prisms in FIG. 1 because their cross sections in the 45-degree-inclined plane is projected on the horizontal plane. To be concrete, the optical axis of rays from the reflecting mirror 6 to the center of the DMD panel 10 is in a plane rotated 45 degrees on the optical axis of the lens 12 in the direction to lower the position of the LED arrays (hereinafter, the direction is referred to as "γ direction" for convenience). Accordingly, the rays reflected from the reflecting mirror 6 apparently run over the mirror 6 in FIG. 1. On the other hand, the LED arrays 1R, 1G and 1B, the first fly-eye lenses 2R, 2G and 2B, the second fly-eye lenses 3R, 3G and 3B, and the XDP 4 are depicted with no distortion because they are in the horizontal plane, that is, in the horizontal plane where the 45-degree-inclined plane is rotated on the optical axis from the LED arrays to the reflecting mirror 6 by −45 degrees in the direction of γ. Incidentally, the transverse direction of the DMD panel is perpendicular to the plane of FIG. 1, namely, depicted in the longitudinal direction of FIG. 1.

FIG. 2 is a cross sectional diagram of the optical system depicted in FIG. 1 in the 45-degree-inclined plane as described above. In FIG. 2, the distortion of the lenses and prism(s) in FIG. 1 is eliminated, and contrary, the apparent widths of the light source, the first and second fly-eye lenses, the XDP, and the DMD panel are narrowed by the square root of 2/1, respectively. The reflected rays from the reflecting mirror 6 do not run over the mirror 6 in this instance. Incidentally, only the light paths of G passing straight are depicted in FIG. 2, while the other light paths of R and B are abbreviated.

The following is optical data of R (curvature radius), d (thickness of lens) and n (refractive index at a line e of wavelength) from a light source to the DMD panel according to the first embodiment.

| Plane Number | R | d | ne/ve | Remarks |
|---|---|---|---|---|
| 000 | ∞ | 0.1 | | LED array (object plane) |
| 001 | ∞ | 0.0 | | Tentative (rotated by 45 degrees on the optical axis) |
| 002 | ∞ | 7.0 | 1.81077/40.7 | First fly-eye lens |
| 003 | −2.753 | 23.0 | | Aspherical (coefficient, subsequence) |
| 004 | 12.0 | 2.0 | 1.474/(PYREX) | Second fly-eye lens |
| 005 | ∞ | 5.0 | | |
| 006 | ∞ | 40.0 | 1.51825/63.9 | XDP |
| 007 | ∞ | 0.0 | | |
| 008 | ∞ | 29.3 | | Tentative (rotated by −45 degrees on the optical axis) |
| 009 | 240.0 | 12.0 | 1.51825/63.9 | |
| 010 | −69.0 | 1.5 | | |
| 011 | −62.3 | 2.0 | 1.81265/25.2 | |
| 012 | −87.3 | 35.0 | | |
| 013 | ∞ | 0.0 | −AIR | Reflection plane |
| 014 | ∞ | −35.0 | −AIR | Tentative |
| 015 | −130.0 | −9.0 | −1.51825/63.9 | |
| 016 | 210.0 | −5.0 | −AIR | |
| 017 | ∞ | −25.53 | −1.51825/63.9 | Illumination prism |
| 018 | ∞ | 0.0 | 1.51825/63.9 | |
| 019 | ∞ | 34.91 | 1.51825/63.9 | Tentative |
| 020 | ∞ | 4.0 | | |
| 021 | ∞ | 3.0 | 1.51825/63.9 | Window material of DMD panel |
| 022 | ∞ | 0.48 | | |
| 023 | ∞ | 0.0 | | Plane of DMD panel |

While the projection lens is generally indispensable to the projector, it is of small significance in the present invention, and thereby the optical data thereof is abbreviated. Incidentally, the above optical data is obtained on the 45-degree-inclined plane. Besides, FIG. 1 shows a case where all of the pixels of the DMD panel are in on state to reflect the rays toward the projection lens.

The aspherical equations in general use are employed for the aspheric surface of the first fly-eye lens, and the numeric values as below are employed as aspherical coefficients.

$\kappa = -0.502$ $A(4) = -5.2993D-04$ $A(6) = 1.2506D-04$ $A(8) = -4.7260D-06$ $A(10) = -1.7143D-06$ $A(12) = 1.3166D-07$ The number of elements of a LED array used in this embodiment is 9×9=81. The pitch thereof is 3.6 mm by 4.4 mm. The aperture of one element lens is 3.6 mm×4.4 mm.

[Modified Embodiment—1]

Figure 4:
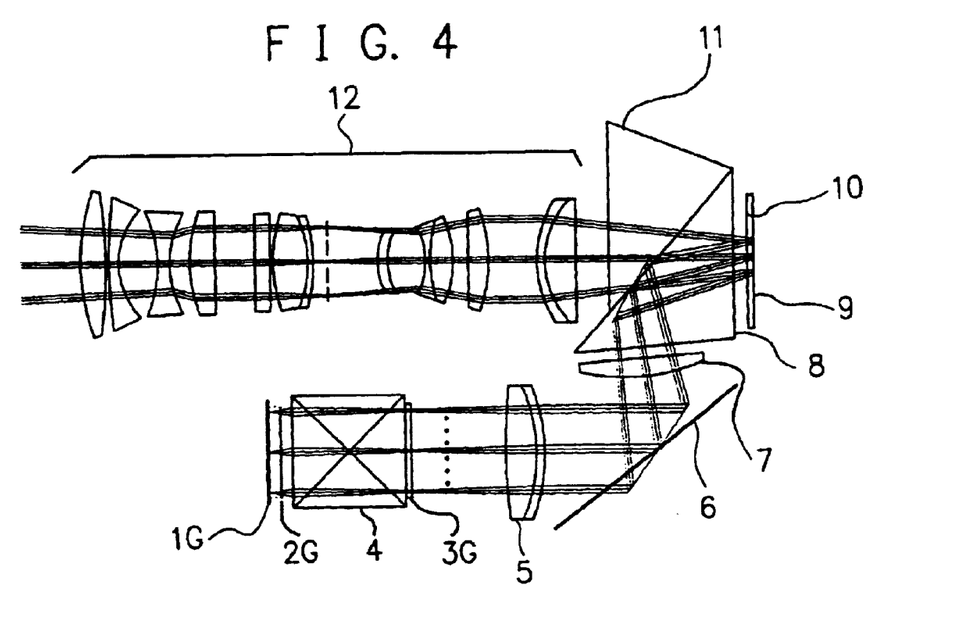
FIG. 4 is a projection diagram wherein a cross section of an optical system (XDP) at its 45-degree-inclined plane against a horizontal plane is projected on the horizontal plane according to a modification of the first embodiment (the light paths of R and B are abbreviated)

FIG. 4 shows a modification of the first embodiment. The optical system of the amended embodiment is the same as that of the first embodiment except that the three first fly-eye lenses contacted with the LED arrays each of which serves as a light source are appressed to or set close to the respective entrance planes of R, G and B of the XDP, and the second fly-eye lens is appressed to or set close to the exit plane of the XDP for common use by R, G and B. Incidentally, only the light paths of G are depicted in FIG. 4, while the other light paths of R and B are abbreviated.

[Modified Embodiment—2]

Figure 5:
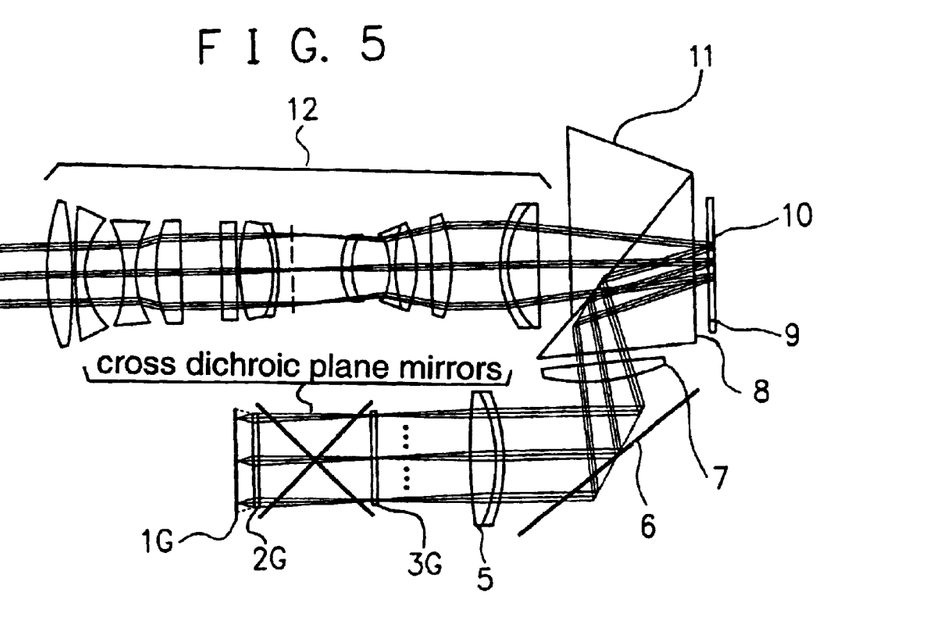
FIG. 5 is a projection diagram wherein a cross section of an optical system (cross dichroic plane mirrors) at its 45-degree-inclined plane against a horizontal plane is projected on the horizontal plane according to another modification of the first embodiment (the light paths of R and B are abbreviated)
Figure 6:
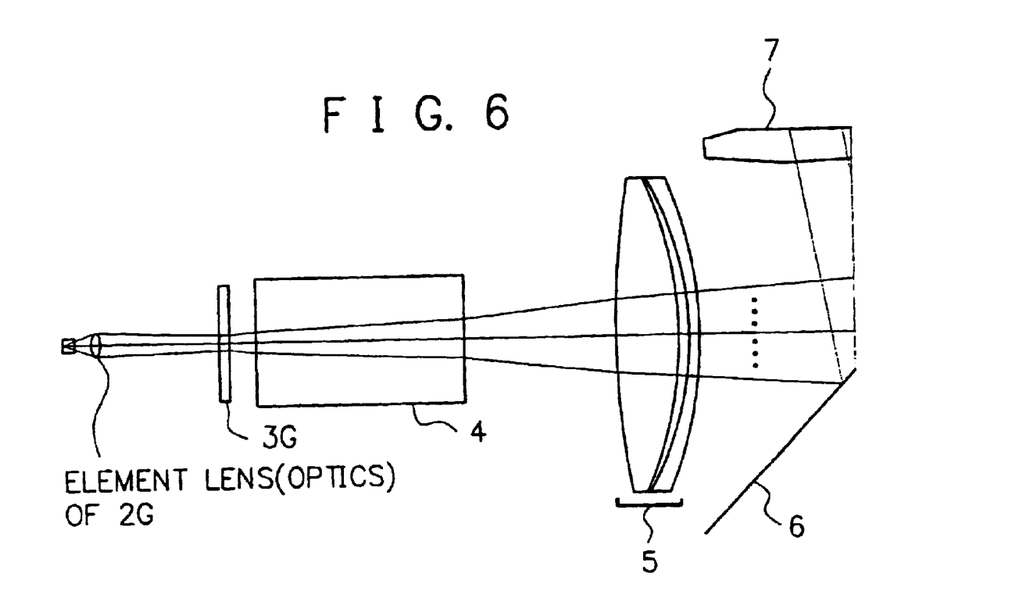
FIG. 6 is an enlarged cross sectional view of (a part of) light paths of G after an element lens of a first fly-eye lens and a second fly-eye lens at a 45-degree-inclined plane according to a second embodiment of the present invention (only one element lens of the first fly-eye lens is depicted)
Figure 7:
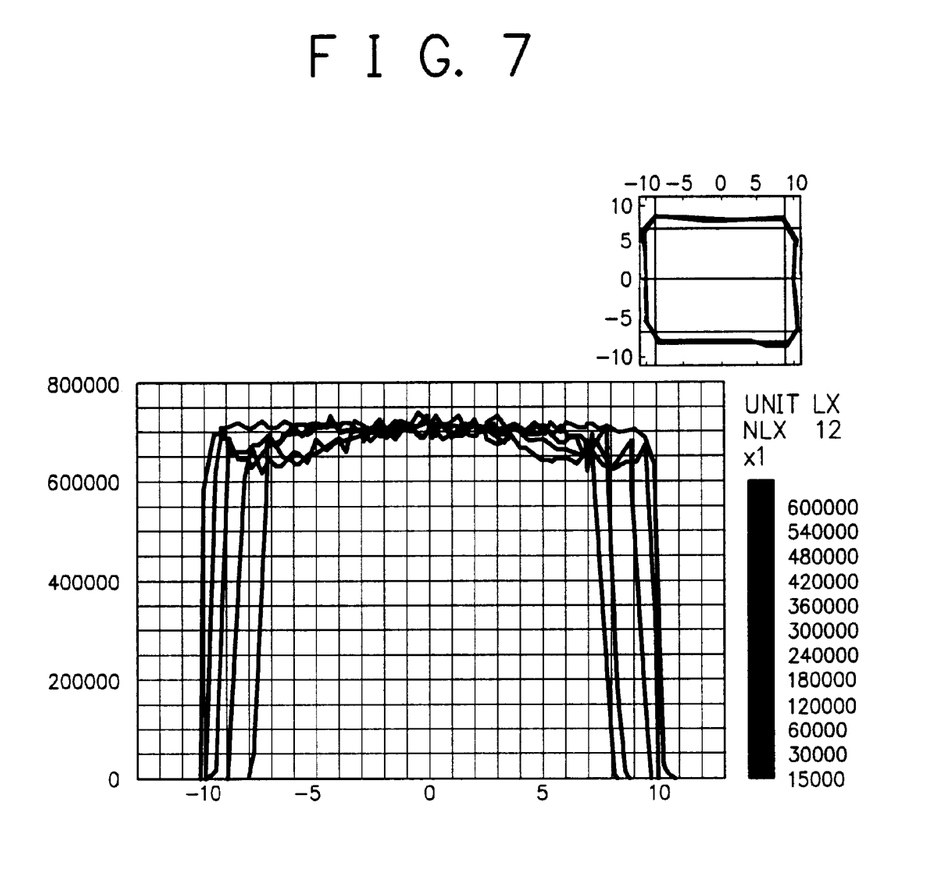
FIG. 7 is a diagram showing an example of simulation of illuminance distribution of illumination on a panel according to the second embodiment (the graduations on the vertical reticles are relative values).

FIG. 5 shows another modification of the first embodiment. The optical system of this embodiment is the same as that of the first embodiment except that the cross dichroic plane mirrors are employed as a substitute for the XDP, the three first fly-eye lenses contacted with the LED arrays each of which serves as a light source are set close to the entrance positions of R, G and B of the cross dichroic plane mirrors, and the second fly-eye lens is disposed close to the exit position of the cross dichroic plane mirrors for common use by R, G and B. Incidentally, only the light paths of G are depicted in FIG. 4, while the other light paths of R and B are abbreviated.

[Second Embodiment]

The following is optical data according to the second embodiment. The optical data is basically the same as that of the first embodiment except that (one side of)the first fly-eye lens is made of a spherical lens and the distance between the first and second fly-eye lenses.

| Plane Number | R | d | ne/ve | Remarks |
|---|---|---|---|---|
| 000 | ∞ | 0.1 | | LED array (object plane) |
| 001 | ∞ | 0.0 | | Tentative (rotated by 45 degrees on the optical axis) |
| 002 | ∞ | 7.0 | 1.88814/40.5 | First fly-eye lens |
| 003 | −3.350 | 22.3 | | (Spherical lens) |
| 004 | 12.0 | 2.0 | 1.474/(PYREX) | Second fly-eye lens |
| 005 | ∞ | 5.0 | | |
| 006 | ∞ | 40.0 | 1.51825/63.9 | XDP |

(the subsequent data is the same as that of the first embodiment) Incidentally, the other configuration is the same as that of the first embodiment. Moreover, the second embodiment may be modified in the same manner as explained in the Modified Embodiments—1 and 2.

Hereat, FIG. 5 is an example of simulation of illuminance distribution of illumination on the panel according to the second embodiment of the present invention. The graduations on the vertical reticles are relative values.

As set forth hereinbefore, according to the present invention, there is provided a 1-chip-type DMD projector employing the LED arrays as a light source for brighter screen, that is, a projector of ultra small size and lightweight, super long lifetime, and much lower power consumption. Moreover, it becomes possible to realize a mobile projector driven by a battery.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A digital-micromirror-device projector for displaying color images by synchronizing respective on/off signals of red, green and blue with on/off signals of the pixels on the digital-micromirror-device panel, comprising:

light emitting diode arrays for red, green and blue;

first fly-eye lenses disposed in contact with the light emitting diode arrays;

second fly-eye lenses disposed at a distance from the first fly-eye lenses;

a cross dichroic prism into which lights of red, green and blue projected from the second fly-eye lenses enters through respective entrance planes for red, green and blue, and which projects synthesized light of red, green and blue through a remaining exit plane;

an illumination optical system for focusing and superposing extended images, which are of the same number as elements of the light emitting diode arrays, from exit pupils of respective element lenses of the first fly-eye lenses via the corresponding element lenses of the second fly-eye lenses and the subsequent illumination lenses on a digital-micromirror-device panel on the occasion of illuminating the digital-micromirror-device panel with the synthesized light projected from the cross dichroic prism; and a projection optical system for focusing rays reflected from on-pixels of the digital-micromirror-device panel on a screen in response to on/off switch of pixels of the digital-micromirror-device panel.

2. The digital-micromirror-device projector as claimed in claim 1, wherein dicroic mirrors of the cross dichroic prism are replaced by dichroic plane mirrors.

3. The digital-micromirror-device projector as claimed in claim 1, wherein one side of the respective elements of the first fly-eye lenses disposed in contact with the light emitting diode arrays is aspherical to illuminate the plane of the digital-micromirror-device panel with high illuminance and high uniformity.

4. The digital-micromirror-device projector as claimed in claim 1, wherein one side of the respective elements of the first fly-eye lenses disposed in contact with the light emitting diode arrays is spherical, whose curvature radius R mm, thickness of lens d mm, and refractive index n at a line e of wavelength satisfy the following three conditional expressions.

$$|R| \leq 5.0 \qquad (1)$$

$$d \geq 5.0 \qquad (2)$$

$$n \geq 1.8 \qquad (3)$$

5. The digital-micromirror-device projector as claimed in claim 1, wherein:

dicroic mirrors of the cross dichroic prism are replaced by dichroic plane mirrors; and one side of the respective elements of the first fly-eye lenses disposed in contact with the light emitting diode arrays is aspherical to illuminate the plane of the digital-micromirror-device panel with high illuminance and high uniformity.

6. The digital-micromirror-device projector as claimed in claim 1, wherein:

dicroic mirrors of the cross dichroic prism are replaced by dichroic plane mirrors; and one side of the respective elements of the first fly-eye lenses disposed in contact with the light emitting diode arrays is spherical, whose curvature radius R mm, thickness of lens d mm, and refractive index n at a line e of wavelength satisfy the following three conditional expressions.

$$|R| \leq 5.0 \qquad (1)$$

$$d \geq 5.0 \qquad (2)$$

$$n \geq 1.8 \qquad (3)$$

7. A digital-micromirror-device projector for displaying color images by synchronizing respective on/off signals of red, green and blue with on/off signals of the pixels of the digital-micromirror-device panel comprising:

light emitting diode arrays for red, green and blue;

first fly-eye lenses disposed in contact with the light emitting diode arrays, as well as in contact with or close to entrance planes for red, green and blue of a cross dichroic prism;

the cross dichroic prism into which lights of red, green and blue projected from the first fly-eye lenses enters through the respective entrance planes for red, green and blue, and which projects synthesized light of red, green and blue through a remaining exit plane;

a second fly-eye lens disposed in contact with or close to the exit plane of the cross dichroic prism for receiving the synthesized light of red, green and blue from the exit plane;

an illumination optical system for focusing and superposing extended images, which are of the same number as elements of the light emitting diode arrays, from exit pupils of respective element lenses of the first fly-eye lenses via the cross dichroic prism, the corresponding element lenses of the second fly-eye lens and the subsequent illumination lenses on a digital-micromirror-device panel on the occasion of illuminating the digital-micromirror-device panel with the synthesized light projected from the cross dichroic prism; and a projection optical system for focusing rays reflected from on-pixels of the digital-micromirror-device panel on a screen in response to on/off switch of pixels of the digital-micromirror-device panel.

8. The digital-micromirror-device projector as clamed in claim 7, wherein dicroic mirrors of the cross dichroic prism are replaced by dichroic plane mirrors.

9. The digital-micromirror-device projector as claimed in claim 7, wherein one side of the respective elements of the first fly-eye lenses disposed in contact with the light emitting diode arrays is aspherical to illuminate the plane of the digital-micromirror-device panel with high illuminance and high uniformity.

10. The digital-micromirror-device projector as claimed in claim 7, wherein one side of the respective elements of the first fly-eye lenses disposed in contact with the light emitting diode arrays is spherical, whose curvature radius R mm, thickness of lens d mm, and refractive index n at a line e of wavelength satisfy the following three conditional expressions.

$$|R| \leq 5.0 \tag{1}$$

$$d \geq 5.0 \tag{2}$$

$$n \geq 1.8 \tag{3}$$

11. The digital-micromirror-device projector as claimed in claim 7, wherein:

dicroic mirrors of the cross dichroic prism are replaced by dichroic plane mirrors; and one side of the respective elements of the first fly-eye lenses disposed in contact with the light emitting diode arrays is aspherical to illuminate the plane of the digital-micromirror-device panel with high illuminance and high uniformity.

12. The digital-micromirror-device projector as claimed in claim 7, wherein:

dicroic mirrors of the cross dichroic prism are replaced by dichroic plane mirrors; and one side of the respective elements of the first fly-eye lenses disposed in contact with the light emitting diode arrays is spherical, whose curvature radius R mm, thickness of lens d mm, and refractive index n at a line e of wavelength satisfy the following three conditional expressions.

$$|R| \leq 5.0 \tag{1}$$

$$d \geq 5.0 \tag{2}$$

$$n \geq 1.8 \tag{3}$$

13. An optical system used in the digital-micromirror-device projector as claimed in any one of claims 1 to 12.

* * * * *